United States Patent
Colantonio et al.

(10) Patent No.: US 6,443,201 B1
(45) Date of Patent: Sep. 3, 2002

(54) PNEUMATIC TIRE WITH EXTENDED LOAD CARRYING CAPACITY

(75) Inventors: Laurent Colantonio, Bastogne (BE); Frank Philpott, Waldbredimus (LU); Gia Van Nguyen, Rossignol (BE); Alain Emile Francois Roesgen, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 36 days.

(21) Appl. No.: 09/592,953

(22) Filed: Jun. 13, 2000

(51) Int. Cl.[7] .............................. B60C 3/00; B60C 5/00; B60C 9/02; B60C 17/04
(52) U.S. Cl. ........................ 152/454; 152/517; 152/544; 152/549; 152/552; 152/548
(58) Field of Search ................... 152/454, 516–518, 152/525, 539, 544, 549, 552, 548

(56) References Cited

U.S. PATENT DOCUMENTS

| | | | |
|---|---|---|---|
| 1,293,528 A | | 2/1919 | Palmer |
| 1,456,062 A | | 5/1923 | Killen |
| 3,515,196 A | * | 6/1970 | Floria ........................ 152/454 |
| 4,203,480 A | * | 5/1980 | Peter ........................ 152/209.1 |
| 4,446,902 A | * | 5/1984 | Madec ...................... 152/209.12 |
| 4,649,979 A | * | 3/1987 | Kazusa ..................... 152/527 |
| 4,811,771 A | | 3/1989 | Shoemaker et al. |
| 5,058,646 A | * | 10/1991 | Kajikawa .................... 152/454 |
| 5,620,538 A | * | 4/1997 | Oshima ..................... 152/209.8 |
| 5,785,781 A | | 7/1998 | Drieux et al. |

FOREIGN PATENT DOCUMENTS

| | | |
|---|---|---|
| DE | 2127588 | 12/1971 |
| DE | 25 34 840 | 8/1975 |
| EP | 0962340 | 12/1999 |
| JP | 59053204 | * 3/1984 |
| NL | 0036837 | * 11/1935 |

* cited by examiner

Primary Examiner—Michael W. Ball
Assistant Examiner—Justin Fischer
(74) Attorney, Agent, or Firm—Howard M. Cohn

(57) ABSTRACT

A pneumatic tire with an increased load carrying capacity (extended load index) but compatible with conventional, commercially available wheel rims, has a modified carcass plyline. The tire has a tread area, a carcass structure including two bead areas each comprising a bead, at least one cord-reinforced elastomeric ply extending between the two bead areas, and two sidewalls, one sidewall extending between the tread area and each bead area. The tire is characterized by: a section width defined by lines L1 and L2 disposed orthogonally to an axis of rotation of the tire and at equal distances on either side of the equatorial plane of the tire; a plyline that follows the meridional path of a radially and axially outermost one of the at least one ply; points P1, P2 on the plyline, being located where the plyline is axially outside of one of the beads and simultaneously at a minimum radial distance of dp1, dp2, respectively, from the axis of rotation AR; lines M1 and M2 each parallel to, and axially inwards of, lines L1 and L2, respectively, and passing through points P1 and P2, respectively; a first distance of 1 mm to 5 mm being the spacing from line L1 to line M1, and from line L2 to line M2; limiting radial distances r1 and r2 that exceed the distances dp1 and dp2, respectively, by a value of 30% to 70% of a section height SH of the tire; and the plyline extending radially outward in each sidewall to the limiting radial distance r1, r2 without axially deviating from lines M1, M2, respectively, by more than a second distance of 0 mm to 5 mm.

13 Claims, 8 Drawing Sheets

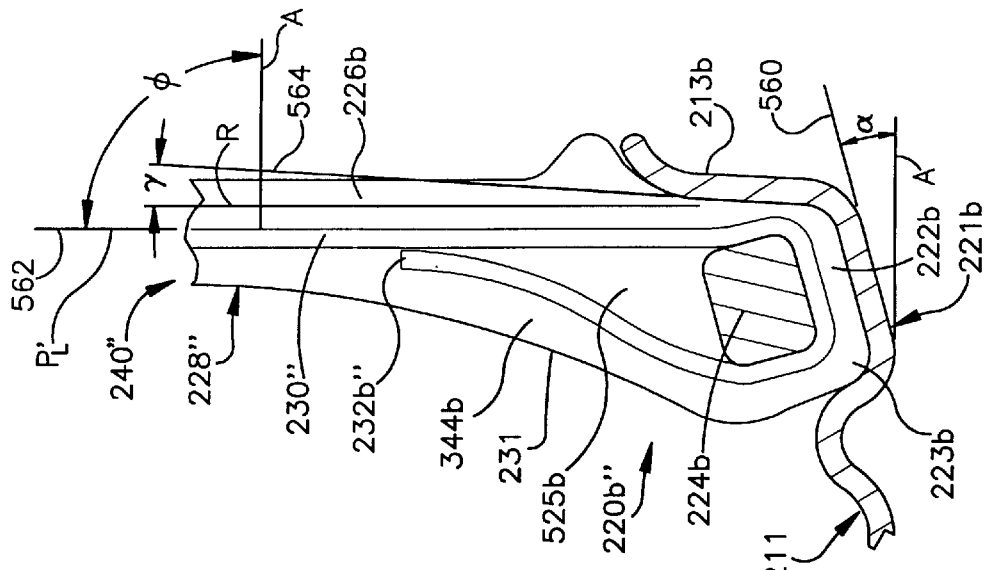
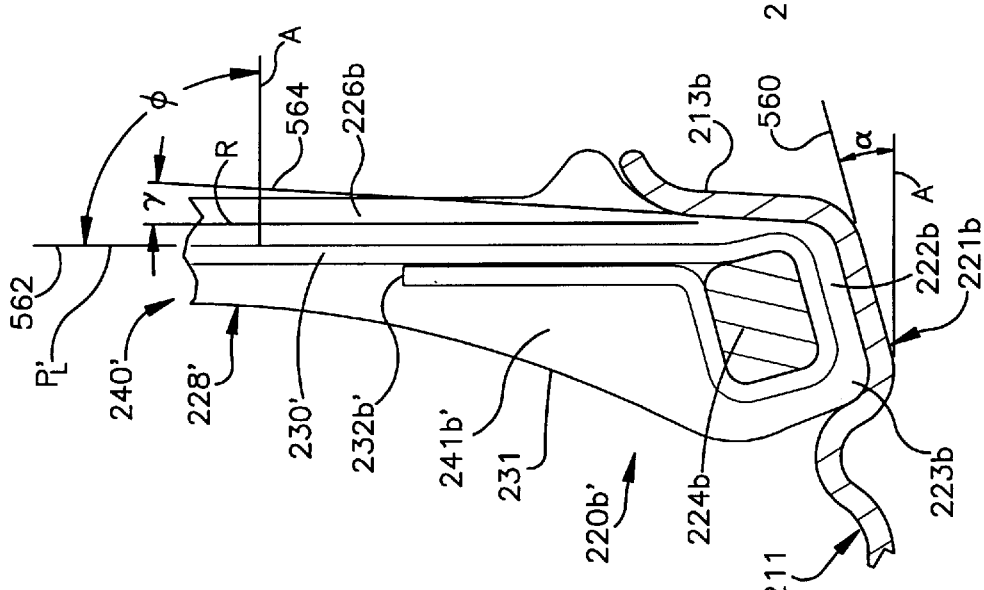
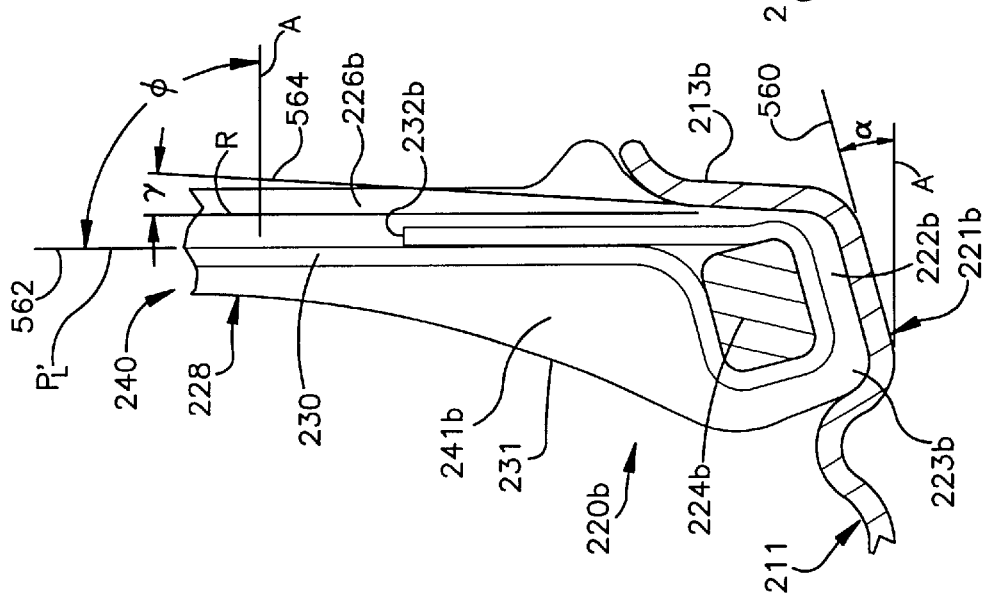

PNEUMATIC TIRE WITH EXTENDED LOAD CARRYING CAPACITY

TECHNICAL FIELD

The present invention generally relates to pneumatic tires, specifically tires with modified sidewall ply lines and bead sections to increase the load carrying capacity.

BACKGROUND OF THE INVENTION

The sidewalls of conventional pneumatic tires provide these conventional tires with desirable flexibility in the radial direction. This radial flexibility allows the tread surface to move radially inward to accommodate irregularities in the road surface. However, the sidewalls of conventional tires also limit the performance of the tire with undesirable axial and circumferential flexibility. Axial sidewall flexibility limits the responsiveness of the tire in cornering, and circumferential flexibility limits the tire's capacity to handle the torsional forces encountered in acceleration and deceleration. In addition, the space required for the sidewall limits the maximum size of the wheel and the size of the brake mechanism that can be fit within the wheel for a given overall tire diameter.

When normally inflated, the sidewalls of conventional tires protect the rim from possible contact with the road surface. Also, conventional sidewalls distribute the weight of the vehicle and the force of impacts with road hazards by acting in tension to confine the compressive force provided by the air in a normally inflated tire. However, when normal inflation air pressure is lost, such as when the tire is punctured, the relatively thin and flexible sidewalls of a conventional tire collapse and buckle in such a manner that the sidewall fails to provide its normal functions of radial flexibility, rim flange protection, or the distribution of forces from the wheel to the road.

The load carrying capacity (LCC), typically represented by the Load Index (LI), of a pneumatic tire is related to the tire fill pressure (P) and the volume (V) contained within the tire. The European Tire and Rim Technical Organization (ETRTO) expresses this relationship with the equation:

$$LCC = \alpha V^\beta (P+P_0)$$

where the α (alpha) and β (beta) coefficients are fixed by the ETRTO by interpreting the results of tire durability and endurance tests. Tire pressure (P) is the ETRTO basic inflation pressure. Similar calculations are employed in the United States by the Tire and Rim Association (TRA) to determine a "Load Index" (LI) comparable to the ETRTO's load carrying capacity. A limitation on pneumatic tire sidewall changes is presented by the LCC (and LI). For example, if a shorter sidewall is desired (lower aspect ratio), then the tire width and/or outside diameter is usually increased to maintain approximately the same tire volume V at fill pressure P in order to maintain the same load carrying capacity LCC. Alternatively, the design of the tire can be changed in order to produce higher values for the LCC alpha and/or beta coefficients in ETRTO testing, thereby achieving the same LCC with a reduced tire volume V. Conventional radial ply tires with low aspect ratios have been developed in part to address the limitations of sidewalls. As noted by U.S. Pat. No. 4,811,771 ('771), there are basically two different shapes of passenger tires on the road today: high aspect ratio tires (aspect ratio >65) and low aspect ratio tires (aspect ratio <65). The low aspect ratio tires, where the radial height of the sidewall is reduced relative to the tire width, have better cornering characteristics and less rolling resistance than the high aspect ratio tires. Patent '771 discloses the use of a special low aspect ratio tire (aspect ratio of 40 to 45) used in conjunction with a new larger diameter wheel and rim (18 to 20 inches).

Recognition of the advantages of reducing the radial height of the sidewall is not new. U.S. Pat. No. 1,293,528 discloses the use of a plurality of chain rings as an "inexpansible" bond to provide a pneumatic tire having a cross section under inflation to present a most advantageous width for weight carrying capacity and which will have only the minimum radial height necessary to provide the requisite cushioning action, so that the wheel rim may be as close as practicable to the surface traveled over and the driving power thereby most efficiently transmitted.

U.S. Pat. No. 1,456,062 ('062) discloses a tire that has no straight sidewalls or belly part, independent of its wide gable-like tread, as in existing types of inflated tires. In fact the whole of the tire cover, with the exception of its suitable inextensible base beads is a shock absorbing tread, which "may be used to replace existing types of solid rubber band tires". The tread is arced, with a narrow blunt apex on its centerline, so that the footprint varies in size with the applied load. As best it can be determined from the description in this 1923 patent, the tire does not have belts or beads in the same sense as modern-day tires. The patent mentions "inextensible base beads" but describes and illustrates these beads as being part of "an abnormally strong and preferably thin supple foundation . . . which may be manufactured from woven cord and be endless and abnormally strong in every direction. This unbelted, non-radial ply tire also provides rim flange protection and limited run flat capability as seen in FIG. 3 of the '062 Patent, where the flattened, deflated tire is thick enough to support the vehicle by pressing against the substantially flat well of the wheel without loading the wheel rim flanges.

Other patents describe tires, such as racing tires, with aspect ratios as low as 25% but still having sidewalls. For example, German Patent No. 25 34 840 discloses a low aspect ratio tire with a running tread having a width which is at least half the total width of the tire, and preferably less than two-thirds of the total width of the tire. The remainder of the tire width comprises sidewalls which are radially diverted towards the seating surfaces of the tire rim.

German Patent No. 2 127 588 discloses a very low profile pneumatic tire for racing cars (aspect ratio less than 25%) having a broad tread molded in a concave shape so that it becomes flat when the tire is inflated at low pressure. The maximum width of the rim is 120% of the wheel diameter. The tire may be of radial or crossply construction. The outside surface of the sidewall is substantially flat and vertical in an un-inflated tire, however the ply line has a standard curvature from the bead into the sidewall.

U.S. Pat. No. 5,785,781 discloses a tire with relatively straight sidewalls combined with a tread-supporting ring on a specially-designed rim, in order to provide support for the tire when running at low or zero pressure. The tire has a radial ply casing on which the points that are furthest apart axially are radially apart close to seats of outwardly sloping beads, which engage sloping seats on the rim which also features an extra rim flange axially interior to the bead. When mounted on the specially-designed rim and inflated to service pressure, the tire's carcass reinforcement (ply) has a constant direction of curvature from the bead area to the corresponding sidewall wherein a tangent to the point of tangency of the [ply line] with the [bead] reinforcement ring forms with the axis of rotation an angle φ, open towards the outside, of at least 70°, preferably at least 80°, and even more preferably greater than 90° as mentioned on column 5, lines 40–61. The base of each rim bead seat slopes at an angle formed with the axis of rotation wherein the angle is open axially inward and radially outward and is greater than 0°, preferably between 10° and 40°. The axially outside rim flange delimits the bead tip with a face which forms with the axis of rotation an angle γ, open radially and axially towards the outside, of less than 90° and preferably between 40° and 50°.

While it may not be readily apparent, there exists a potential to develop a pneumatic radial tire with revolutionary dimension properties providing superior performance when compared to conventional pneumatic radial tires. The challenge is to develop such a tire combining improved handling and performance with adequate radial flexibility, sufficient rim flange protection and enhanced run flat capability suitable for use on conventionally-shaped (i.e., standard) wheel rim designs.

SUMMARY OF THE INVENTION

The present invention concerns changes to the ply line and bead area construction of pneumatic tires in order to achieve an increased load carrying capacity (extended load index) for pneumatic tires designed to mount on conventional, commercially available wheel rims.

According to the invention, a pneumatic tire with an increased load carrying capacity (extended load index) but compatible with conventional, commercially available wheel rims, has a modified carcass ply line. The tire has a tread area, a carcass structure including two bead areas each comprising a bead, at least one cord-reinforced elastomeric ply extends between the two bead areas, and two sidewalls extending between the tread area and each bead area. The tire has a section width (SW) defined by lines L1 and L2 disposed orthogonally to the axis of rotation AR and at a distance of A/2 from the equatorial plane EP of the tire, lines M1 and M2 each parallel to lines L1 and L2, respectively, and axially inwards toward the equatorial plane EP and spaced a distance d1, d2, respectively, of 1 mm to 4 mm from lines L1 and L2, points P1, P2 on lines M1 and M2, respectively, located at the minimum radial distance of dp1, dp2, respectively, from the at least one elastomeric ply to an axis of revolution AR of the tire, the elastomeric ply having a plyline PL including points P1 and P2, the plyline PL extending radially outward from points P1 and P2 a radial distance r1, r2, respectively, to the crown portion CP of the tire without axially deviating from lines M1, M2 by more than a distance d3, d4 of 0 mm to 6 mm. R1, r2 are defined as having a value that exceeds the distance dp1, dp2 by a value of 30% to 70% of the section height SH.

According to the invention, r1, r2 are defined as having a value that exceeds the distance dp1, dp2 by a value of 30% to 70% and preferably 40% to 60% of a section height SH of the tire. The ply line (PL,PL') extends radially outward in the sidewalls from each bead at an angle φ to the axial direction (A) and the sidewall ply line angle φ opens radially outward and is in the range of 80 degrees to 100 degrees. Each bead area has a cross sectional shape which is substantially flat across a bead base having a rim bead seat line which forms an angle α to the axial direction (A) wherein the angle α opens axially and radially outward and is in the range of 5 to 20 degrees. Each bead area has a cross sectional shape which is substantially flat along a rim flange line forming an angle γ to the radial direction (R), wherein the angle y opens axially and radially outward and is in the range of 0 to 10 degrees.

The ply extends with a generally continuous curvature through each sidewall to a tread shoulder so that the tire section width is immediately radially outward of a flange on a rim used for mounting the tire. The ply extends through the sidewall around the bead, passing radially inward of the bead, and having a turned up end located adjacent to the main portion of the at least one ply radially outward of the beads and the bead area and the sidewall area radially outward of the bead and between the ply and the interior carcass wall is at least partially filled with an elastomeric reinforcement. The turned up end of the ply is axially outward of the main portion of the ply.

Also according to the invention, the turned up end of the ply is axially inward of the main portion of the at least one ply, and lies between the interior reinforcement and the main portion of the ply.

According to the invention, the elastomeric reinforcement is made of elastomeric material to reinforce the sidewalls of an extended mobility tire during extended mobility running while uninflated.

According to the invention, the ply can extend from each sidewall radially inward Ace around the bead, first passing axially outward of the bead, then passing radially inward of the bead, then passing axially inward of the bead, and finally extending radially outward to a reversed ply turnup end located axially inward of the main portion of the at least one ply and radially outward of the bead. The elastomeric reinforcement of this embodiment is between the main portion of the at least one ply and the reversed turnup portion of the at least one ply which ends at the reversed ply turnup end. This clastomeric material can be designed to reinforce the sidewalls of an extended mobility tire during extended mobility running while uninflated.

According to the invention, the pneumatic tire has a tread area, two bead areas, two sidewalls extending between the tread area and each bead area; and a carcass structure comprising an interior wall and at least one cord-reinforced elastomeric ply extending between the two bead areas. The ply has a sidewall ply line that extends radially outward from each bead at an angle φ to the axial direction. The sidewall ply line angle φ opens radially outward and is in the range of 80 to 100 degrees. In order to be compatible with conventional rims, each bead area has a cross sectional shape that is substantially flat across a bead base having a rim bead seat line which forms an angle a to the axial direction. The angle a opens axially and radially outward and is in the range of 5 to 20 degrees, and each bead area has a cross sectional shape which can be substantially flat along a rim flange line forming an angle γ to the radial direction, wherein the angle γ opens axially and radially outward and is in the range of 0 to 10 degrees.

In further aspects of the invention, the inventive ply line is achieved in various embodiments utilizing both outside and inside (reversed) ply turnup ends, and various forms of bead area reinforcing elements.

In a further aspect of the invention, the at least one ply extends from the sidewall around the bead, passing radially inward of the bead, and having a turned up end located adjacent to the main portion of the at least one ply radially outward of the beads; and the bead area, and at least a portion of the sidewall area radially outward of the bead and between the at least one ply and the interior carcass wall is at least partially filled with an elastomeric reinforcing interior bead reinforcing.

In alternate embodiments, the turned up end can be either axially outward or axially inward of the main portion of the at least one ply. For the inward (reversed) turnup end embodiments, the interior apex may be between the interior wall and the reversed turnup end, or the apex may be a center apex lying between the main portion of the at least one ply and the reversed turnup portion of the at least one ply which ends at the reversed ply turnup end. The apex elements are preferably shaped to produce a uniformly curved interior surface.

In a further aspect of the invention, the bead reinforcing elements are made of elastomeric material designed to reinforce the sidewalls of an extended mobility tire during extended mobility running while uninflated (running "flat").

A feature of the invention is that the inventive tire can replace an existing tire on a wheel rim of conventional rim shape, but larger rim width and diameter, while maintaining the same load carrying capacity, outside tire diameter and section width as the existing tire.

An alternative feature of the invention is that the inventive tire can replace an existing tire with a smaller tire which still mounts on a wheel rim of conventional rim shape, but larger rim width, while maintaining the same load carrying capacity as the existing tire.

Other aspects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199a, 199b, 199c, etc.

Figure 1:
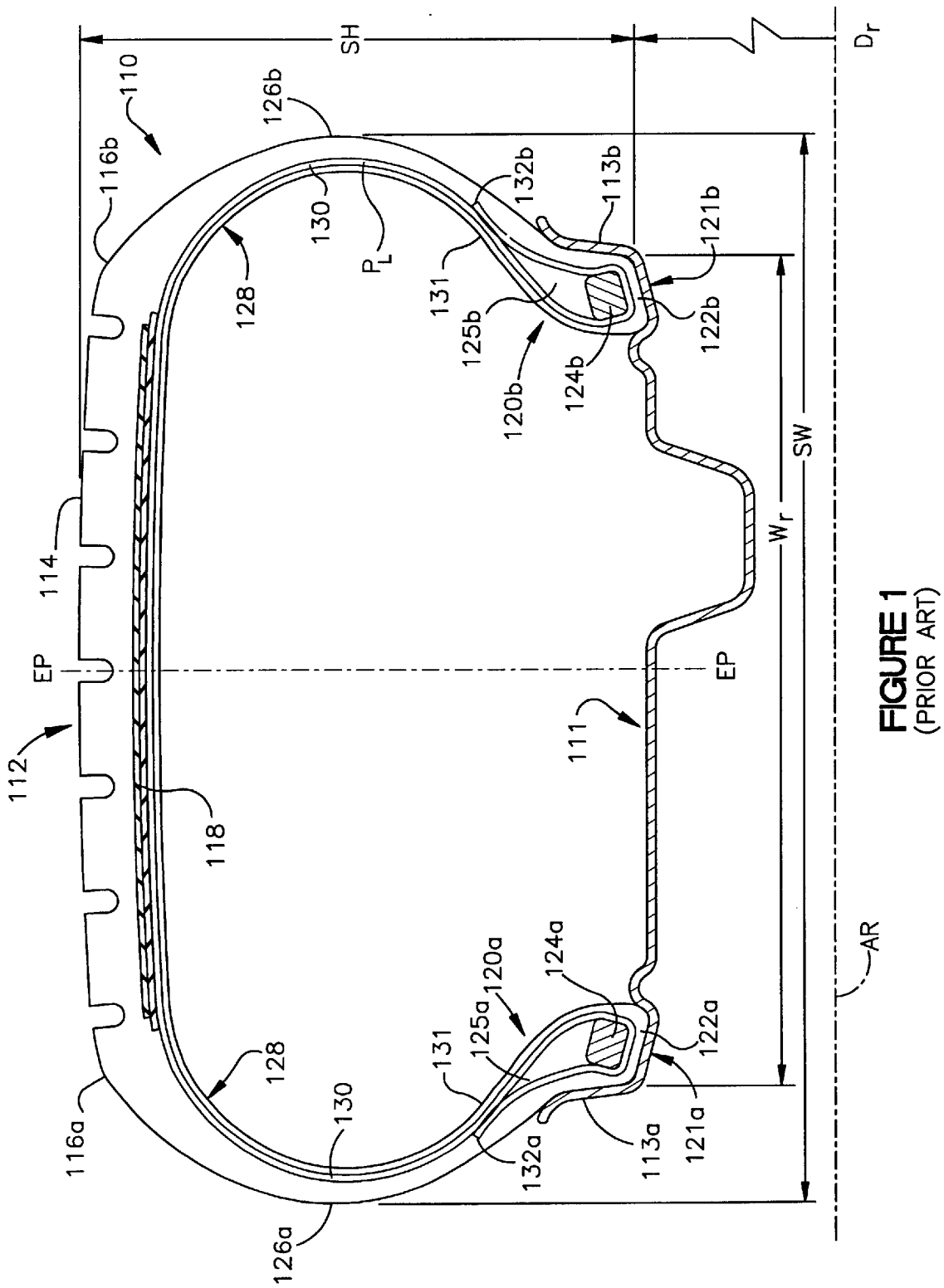
Figure 1A:
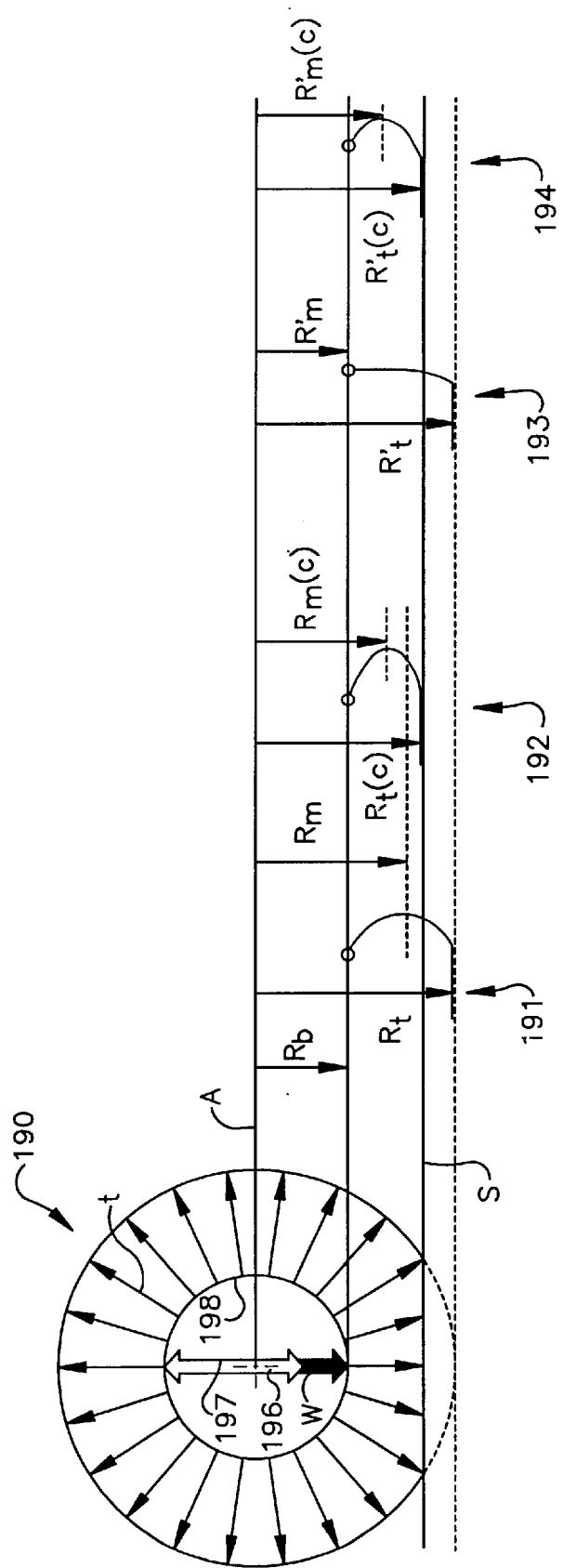
Figure 2A:
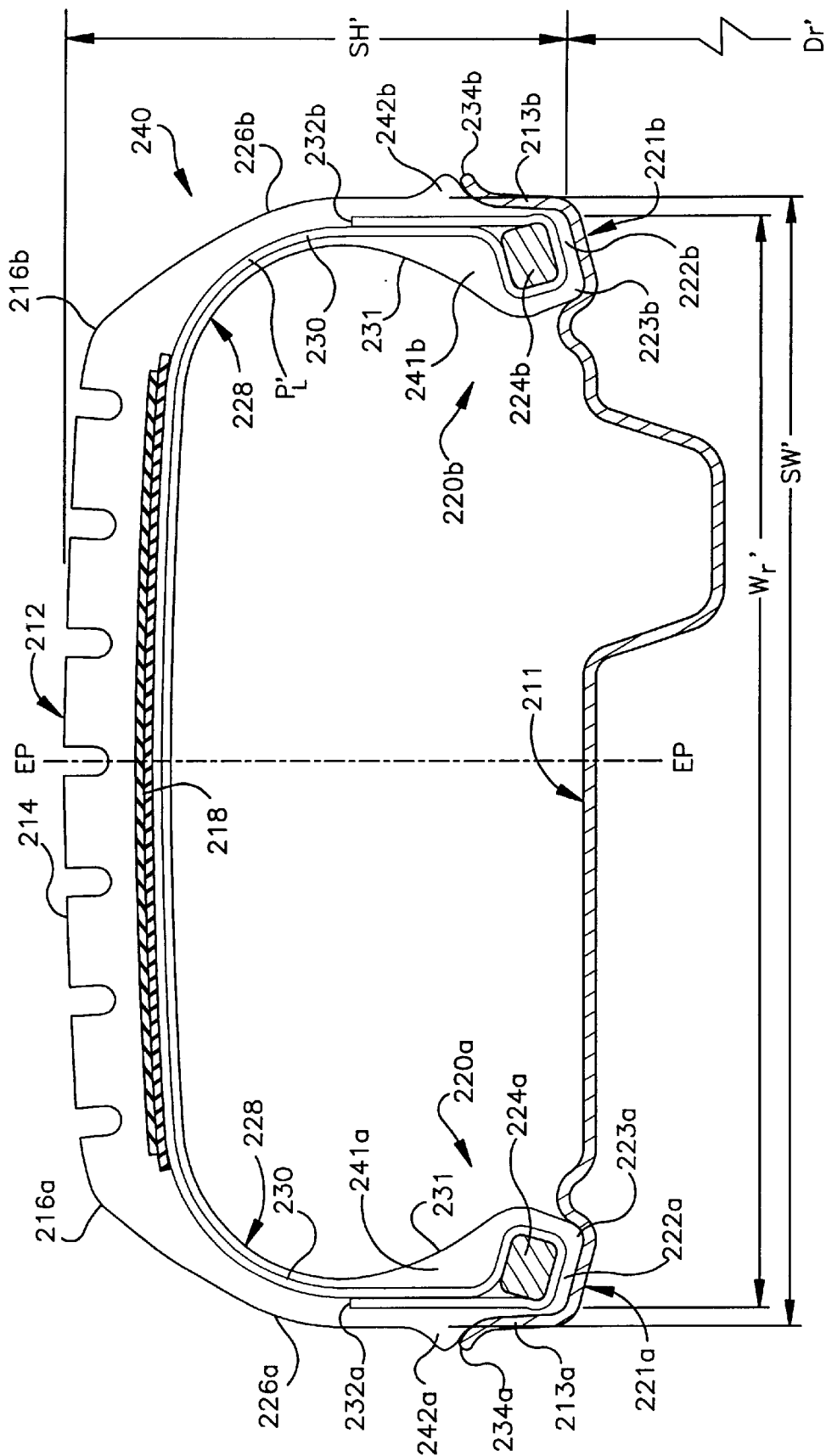
Figure 2B:
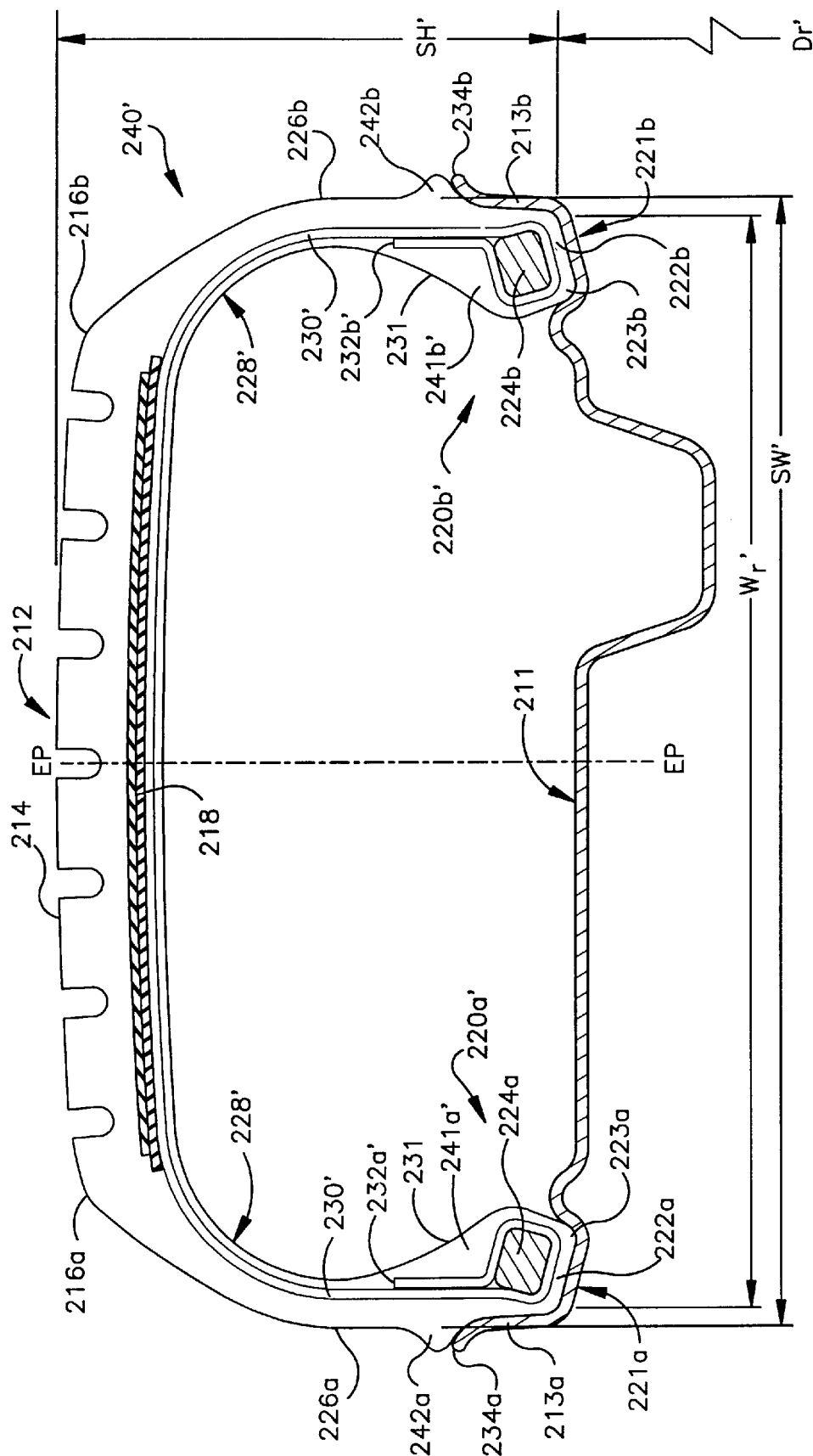
Figure 3A:
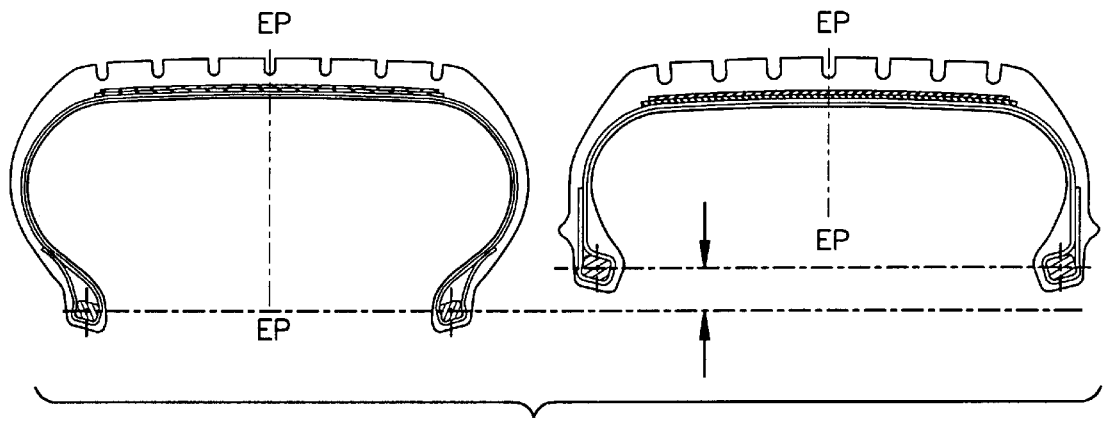
Figure 3B:
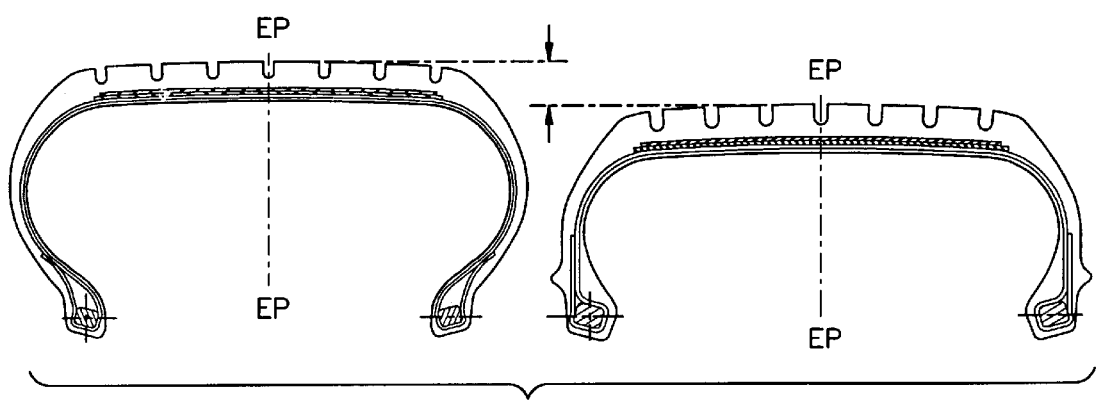
Figure 4A:
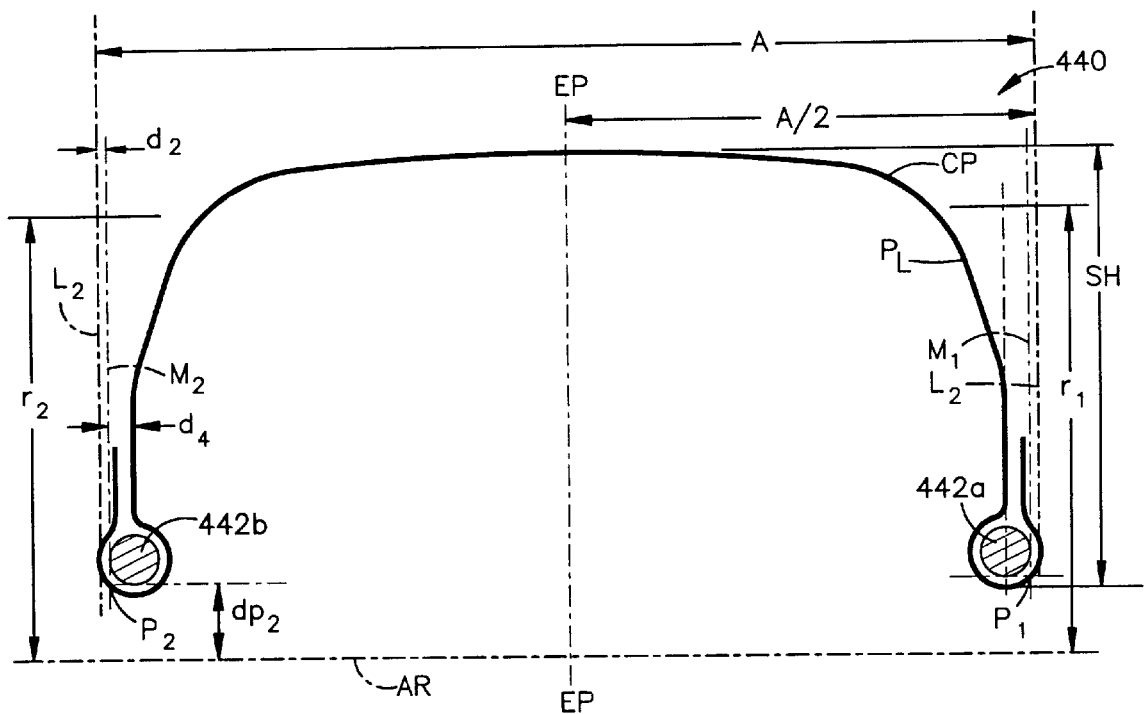
Figure 4B:
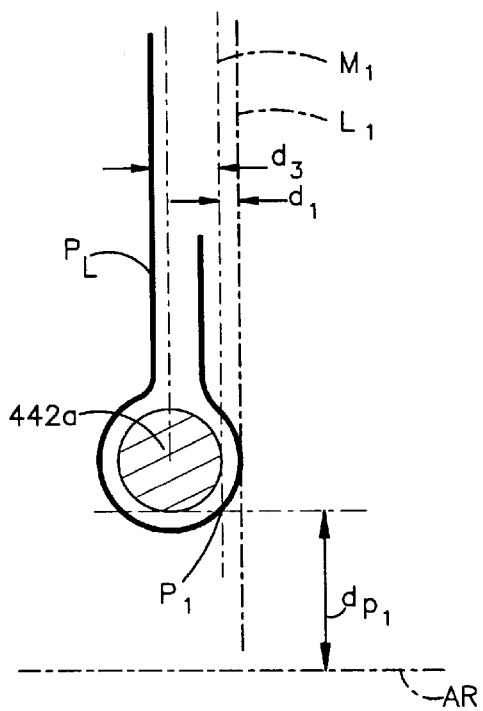
Figure 6:
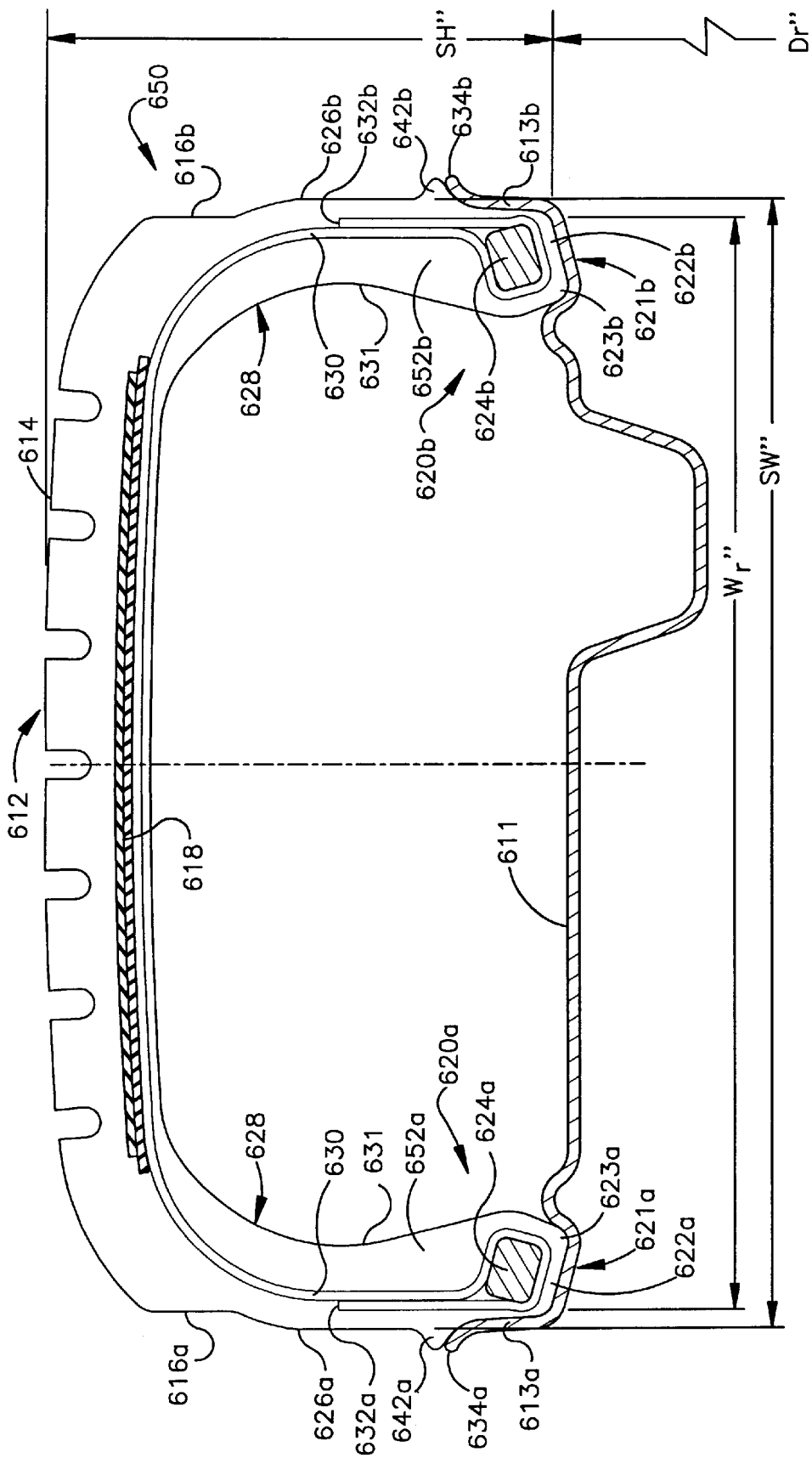

The structure, operation, and advantages of the present preferred embodiment of the invention will become further apparent upon consideration of the following description taken in conjunction with the accompanying drawings, wherein:

FIG. 1 is a cross-sectional view of a prior art tire, with shading in the rubber and ply areas eliminated for clarity;

FIG. 1A is schematic representations of a side view and four partial cross-section views of tires illustrating compression and tension effects, according to the invention;

FIG. 2A is a cross-sectional view of a tire embodiment having an outside turnup end, with shading in the rubber and ply areas eliminated for clarity, according to the invention;

FIG. 2B is a cross-sectional view of an alternate tire embodiment having an inside (reversed) turnup end, with shading in the rubber and ply areas eliminated for clarity, according to the invention;

FIG. 3A shows a cross-sectional view of a portion of a conventional tire compared with a comparable tire having an increased rim diameter according to the present invention;

FIG. 3B shows a cross-sectional view of a portion of a conventional tire compared with a comparable tire having an increased rim width according to the present invention;

FIG. 4A shows a cross-sectional schematic representation of a tire incorporating the features according to the present invention;

FIG. 4B shows an enlarged view of the bead area of FIG. 4A;

FIG. 5A is a magnified view of the bead area and portions of the sidewall area and rim for the embodiment of the tire of FIG. 2A with shading in the rubber and ply areas eliminated for clarity, according to the invention;

FIG. 5B is a magnified view of the bead area and portions of the sidewall area and rim for an alternate embodiment of the tire of FIG. 2B where the ply turnup is inward around the bead with shading in the rubber and ply areas eliminated for clarity, according to the invention;

FIG. 5C is a magnified view of the bead area and portions of the sidewall area and rim for an alternate embodiment of the tire of FIG. 2B with shading in the rubber and ply areas eliminated for clarity, according to the invention; and FIG. 6 is a cross-sectional view of an extended mobility tire embodiment, with shading in the rubber and ply areas eliminated for clarity, according to the invention.

DEFINITIONS

"Aspect Ratio" means the ratio of the section height of the tire to the section width of the tire, the ratio herein expressed as a percentage.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Apex" means elastomeric filler normally used in an area within the tire where air could be trapped in its absence, such as radially outward of the beads.

"Bead" means the circumferentially substantially inextensible metal wire assembly which forms the core of the bead area, and is associated with holding the tire to the rim.

"Bead Area" means the circumferentially-extending region of the tire surrounding and including the bead, and shaped to fit the wheel rim and bead seat.

"Bead Base" means the relatively flat portion of the bead area between the bead heel and bead toe and which contacts the wheel rim's bead seat.

"Bead Heel" means the axially outer bead area edge that contacts the rim flange.

"Bead Seat" means the flat portion of the rim on which the bead area rests.

"Bead Toe" means the axially inner bead area edge.

"Belt Structure" or "Reinforcement Belts" or "Belt Package" means at least two annular layers or plies of parallel cords, woven or unwoven, underlying the tread, unanchored to the beads, and having both left and right cord angles in the range from 18 degrees to 30 degrees relative to the equatorial plane of the tire.

"Carcass" means the tire structure apart from the belt structure, tread, and undertread, but including the bead areas and plies.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Crown area" means that portion of the tire carcass radially inward of the tread.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Ply" means a cord-reinforced layer of rubber coated, radially deployed, or otherwise parallel cords.

"Ply Line" means the radial cross section geometrical curve generated by a mounted, inflation stressed ply.

"Radial" and "radially" mean directions normal to the axis of rotation of the tire, i.e., radial with respect to the axis of rotation.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Rim Diameter (nominal)" means approximate diameter of the rim measured at the bottom of the flange (nominal or bead seat).

"Rim Width" means the distance between the inside rim flange surfaces.

"Section Height" means half the difference between the outer diameter of the tire and the nominal rim diameter.

"Section Width" means the maximum width of a properly mounted and inflated tire, measured between outside surfaces of the two sidewalls, excluding decorations and sidewall-protecting ribs or bars.

"Shoulder" means the upper portion of sidewall just below the tread edge.

"Sidewall" means that portion of a tire between the tread and the bead area.

"Tread" means the ground contacting portion of a tire.

"Tread Area" means the annular portion of a tire including the crown area of the carcass, the tread, and everything between the two (e.g., belt structure, undertread).

"Undertread" means the tread material between the bottom of the tread grooves and the carcass.

DETAILED DESCRIPTION OF THE INVENTION

Prior Art Embodiment

FIG. 1 shows a partial cross section of a prior art tire 110 on a standard wheel rim 111. For example, the passenger car tire 110 is a P205/55R16 and the rim 111 is a conventionally-shaped 6.5J15H2 rim wherein the "J" denotes the shape of the flanges 113a, 113b; and the "H2" denotes the shape of the rim base 127a, 127b. The prior art tire 110 has a tread area 112 comprising a ground contacting tread 114 having two tread shoulders 116a, 116b and a circumferential belt structure 118 located radially inward of the tread. The prior art tire 110 has two bead areas 120a, 120b, each bead area having a bead base 122a, 122b, an inextensible metal wire bead 124a, 124b, and a center apex 125a, 125b radially outward of the bead 124a, 124b. Elastomeric sidewalls 126a, 126b extend radially outward from the bead areas 120a, 120b respectively, to the tread shoulders 116a, 116b respectively. As shown in FIG. 1, the conventional tire 110 has a carcass structure 128 comprising an interior wall 131, and at least one cord reinforced elastomeric ply 130 extending radially outward from each bead area 120a, 120b through the sidewalls 126a, 126b respectively, and traversing the tread area 112 radially inward of the belt structure 118. From the sidewall 126a, 126b, the ply 130 extends around the bead 124a, 124b and apex 125a, 125b, passing radially inward of the bead 124a, 124b, and having a ply turnup end 132a, 132b located adjacent to the main portion of the ply 130 in the bead areas 120a, 120b radially outward of the beads 124a, 124b. The ply 130 falls in the ply line 130. The apex 125a, 125b generally fills the space radially outward of the bead 124a, 124b and between the ply 130 and the turnup ends 132a, 132b.

The prior art tire 110 is, for example, a P205/55R16 tire which has an aspect ratio of approximately 55, and an outside diameter of approximately 24.88 inches (632 mm). Typical low aspect ratio tires have an aspect ratio ranging from 35 to 65. For the exemplary P205/55R16 tire 110 and 6.5J15H2 rim 111, the measurements are approximately as follows: rim width (Wr) is 6.5 inches (165 mm); rim diameter (Dr) is 16 inches (406 mm); section width (SW) is 8.07 inches (205 mm); and section height (SH) is 4.44 inches (113 mm). The aspect ratio calculates to 100(113/205)=55%. The load carrying capacity LCC is approximately 615 kg at 2.5 bar that is comparable to a load index LI of approximately 91.

Theoretical Basis of the Present Invention

In a conventional prior art tire 110, as shown in FIG. 1, the sidewalls 126a, 126b provide flexibility in the radial direction to allow the tread surface to move radially inward and maintain contact with the road surface. As described in more detail before, there are negative side effects from the sidewalls which limit the tire performance with undesirable axial and circumferential flexibility.

The tire 240 of the present invention, as shown in FIG. 2A, substantially eliminates the portion of the sidewalls having an outer surface that is both axially inward of the section width SW and radially inward (toward the axis of revolution AR) from the section width of a prior art tire of the type shown in FIG. 1.

An important aspect of the present invention is that the ply line PL of tire 240 follows the ply line PL of the prior art tire 110. This new tire 240 having a much shorter sidewall, as compared with the prior art designs, provides significant advantages in both performance and load carrying capacity (LCC).

A detailed description of the new tire shape now follows. Referring to FIG. 4A, a tire 440, according to the present invention, is shown with a section width (SW) equal to A. Lines L1 and L2 orthogonal to the wheel axle AR are located at a distance of A/2 from the equatorial plane EP of tire 440. Lines L1 and L2 define the axially outward limit of the tire geometry, if we exclude the rim flange protector geometry. While only one side of the tire 440 is described in detail herein, the opposite side is a mirror image and has the same characteristics. Parallel to lines L1 and L2 and axially inward towards the EP therefrom, as shown in FIGS. 4A and 4B, we define new lines M1 and M2 spaced a distance d1 and d2, respectively of 1 mm to 5 mm, and preferable 2 mm to 4 mm from lines L1 and L2. We define on these lines M1 and M2 points P1 and P2, having a radial distance dp1 and dp2, respectively, to the axis of revolution AR equal to the minimum distance that the ply portions geometrically located axially outward from the beads 442a, 442b, respectively, can be from the AR. This minimal distance is itself limited by rim diameter and other design considerations, such as bead compression values. The plyline PL, defined by the present invention, includes points P1 and P2.

From points P1 and P2 to a radial distance r1, r2, respectively, away from the axis of rotation AR, the plyline PL of the new inventive tire extends radially outward from the axis of rotation in such a way that it cannot axially deviate from lines M1 and M2 by more than a distance d3, d4 respectively of 0 mm to 5 mm, and preferably 0 mm to 3 mm. The radial distances r1 and r2 are defined as having values that exceeds the distances dp1 and dp2, respectively, from the axis of rotation AR to the point P1, P2 by a value of about 30% to 70% of the section height SH, and preferably a value of 40% to 60% of SH. From the points r1 and r2, the plyline PL joins the crown area or portion CP (the portion between the tread and the sidewalls) following a path that doesn't have any inflexion point. The resulting new tire 440 has a much shorter sidewall, as compared with the prior art tire design, see FIG. 3A.

It is an aspect of the present invention to improve the load carrying capacity (LCC) of a given pneumatic tire size by means other than increasing the tire volume or pressure, therefore modifying the α (alpha) and β (beta) coefficients in the ETRTO calculation of LCC. (Increasing the LCC is comparable to increasing the load index (LI) which is determined by the Tire and Rim Association.) The inventive pneumatic tire design and its variations which are presented hereinbelow achieve this, thereby allowing an improved LCC for existing tire and rim sizes, or allowing smaller tires to be utilized on vehicles wherein the new smaller tires have the same or a better LCC compared to the original vehicle tires. The "smaller" tires of this invention may have several embodiments. Two examples to which the present invention is not limited are illustrated in comparison to a conventional tire, in FIGS. 3A and 3B.

a) For example, as shown in FIG. 3A, the new smaller tire 340A could have the same outside diameter and same section width as the original tire 110, but would have a smaller section height and correspondingly larger wheel and rim diameter. Although the overall dimensions of the wheel/rim/tire assembly remain generally the same for the purposes of fitting in the vehicle's wheel well and also for maintaining vehicle ground clearance, the larger wheel/rim diameter allows for larger, more efficient brakes and/or better brake convection cooling.

b) In a second example, as shown in FIG. 3B, the new tire 340B could have a smaller outside diameter compared to the original tire 110, while maintaining the same section width and wheel and rim diameter as the original tire.

The calculation of load carrying capacity LCC is based on the assumption that tire durability is a function of tire sidewall deflection. In particular, critical percent deflection limits have been established for various tire categories. The LCC for a given tire is then the load which will cause the tire to deflect to the critical percent deflection limit for that tire. Empirical testing on tires made according to the teachings of the present invention has shown that the inventive tire exhibits less percent deflection for a given load than the prior art tire that it replaces. This is believed to be due to inventive characteristics which improve both the structural support and pneumatic support.

The pneumatic support theory is based on the following equation [1], which is illustrated in FIG. 1A:

$$t \propto (P/2)(1-(R_m/R_t)^2) \qquad [1]$$

where t is the radial tension in the sidewalls, the symbol "∝" means "proportional to", P is the tire fill pressure (gauge), $R_t$ is the radial distance from the tire axis A to the interior surface of the tread area, and $R_m$ is the radial distance from the tire axis A to the point where the sidewall section width is at a maximum. In FIG. 1A, the radial tension lines t are illustrated as radial arrows in the side view 190 of a generic tire. The tire axis is shown as the line A, and a load bearing surface S is shown below the tire which in view 190 is compressed against the surface S. Views 191, 192, 193, and 194 are schematic representations of partial cross-sections of tires, showing various radial distances, including $R_b$ which is a radial distance from the tire axis A to the portion of the bead/sidewall area 198 which is immediately radially outward of the rim flange and therefore able to flex.

In an unloaded tire at a given pressure P, the radial distances Rt are equal in all directions and the radial distances Rm are equal in all directions, therefore the tension t is the same everywhere. View 191 shows the relative radial distances for an unloaded/uncompressed portion of a tire. As seen in views 190 and 192 of the same tire as view 191, when the tire is loaded by a weight W, the weight W compresses the tire against a load bearing surface S causing deflection mainly in the lower portion of the tire, reducing the tread radius $R_t$ to a compressed tread radius $R_t(c)$ and reducing the max sidewall radius $R_m$ to a compressed max sidewall radius $R_m(c)$. It can be mathematically proven that for any given tire compression which reduces the tread radius $R_t$ by a certain percentage, the corresponding percent reduction of the max sidewall radius $R_m$ will always be less. Therefore the ratio $(R_m/R_t)^2$ in equation [1] will increase when the tire is compressed, thereby reducing the tension t in the sidewalls of the lower half of the tire. It can be seen that the sum (integral) of the vertical components of the tensions t in the upper half of the tire (graphically represented by the height of the arrow 197) exceeds that of the tensions t in the lower half of the tire, thereby creating a net upward force to counterbalance the downward force W of the load W on the tire.

The present invention takes advantage of the result of changing the contour of a tire in a way which places the maximum sidewall width very close to the bead area of a tire, for example as illustrated in views 193 and 194 of FIG. 1A showing partial cross sections of a tire made according to the present invention. View 193 shows an uncompressed portion of the inventive tire, having tread radius $R'_t$ which is roughly equivalent to the tread radius $R_t$ of the conventional tire shown in view 191, and having a max sidewall radius $R'_m$ which is essentially equal to the bead area radius $R_b$ and is therefore smaller than the max sidewall radius $R_m$ of the conventional tire shown in view 191. In view 194, the tire has been compressed the same amount to a compressed tread radius $R'_t(c)$ which is roughly equivalent to the compressed tread radius $R_t(c)$ of the compressed conventional tire shown in view 192. As the sidewall of the compressed inventive tire in view 194 bulges under compression, the maximum sidewall radius cannot decrease, and may actually increase as shown to a compressed max sidewall radius $R'_m(c)$ which is larger than the max sidewall radius $R'_m$ of the uncompressed inventive tire. As a result, the ratio $(R_m/R_t)^2$ in equation [1] will increase to a value $(R'_m(c)/R'_t(c))^2$ for the inventive tire, a value which is greater than the value $(R_m(c)/R_t(c))^2$ for the conventional tire having the same tread radius compression $(R'_t(c)=R_t(c))$. Thus the tension t in the compressed sidewalls of the inventive tire will be reduced by a greater amount than the corresponding tension t reduction in the conventional tire sidewalls which are compressed by the same amount. This greater reduction in tension t in the lower half of a loaded inventive tire means that the load weight W required to produce the compression to a tread radius $R'_t(c)$ is correspondingly greater than the load weight W required to produce the compression to an equal tread radius $R_t(c)$ in the conventional tire. Alternatively, the same load weight W will produce a smaller compression (or percent deflection) in the inventive tire compared to the conventional tire. This translates to a higher load carrying capacity for the inventive tire.

The above theory is simplified, and does not include the effects of sidewall and tread area stiffness. The effectiveness of the present invention can also be explained in terms of increased sidewall stiffness which causes reduced percent deflection for a given load weight W. This effect is particularly important in extended mobility technology (EMT) tires which are designed to function acceptably well for a limited vehicle speed and mileage after the EMT tire has lost most or all of its inflation pressure, thereby reducing the tensional support of equation [1] to zero at zero pressure P.

Preferred Embodiment of the Present Invention

Referring now to FIG. 2A, a preferred embodiment of the present invention is illustrated as a partial cross section of a tire 240 mounted on a conventionally-shaped wheel rim 211. The rim 211 (compare 111) has the same general shape as the standard rim 111, including same-shaped bead seats 221a, 221b, and same-shaped flanges 213a, 213b with axially extending portions 234a, 234b. However, the rim 211 for the tire 240 of this invention has a rim width Wr' which is approximately 1 to 3 inches (25.4–76.2 mm) wider than the rim width Wr of the standard rim 111. As detailed hereinbelow, various embodiments of the present invention may also require rim diameters Dr' which are different from the standard rim diameter Dr of the standard rim 111.

The tire 240 has a tread area 212 comprising a ground contacting tread 214 having two tread shoulders 216a, 216b and a circumferential belt structure 218 located radially inward of the tread 214. The tire 240 has two bead areas 220a, 220b, each bead area having an inextensible metal wire bead 224a, 224b, a bead base 222a, 222b ending in a bead toe 223a, 223b which is axially and radially inward from the bead 224a, 224b, and an interior reinforcement 241a, 241b radially outward of the bead 224a, 224b. Some optional elements of the bead area 220a, 220b are not shown, but may include such common elements as chafers, chippers, and flippers. Elastomeric sidewalls 226a, 226b extend radially outward from the bead areas 220a, 220b respectively, to the tread shoulders 216a, 216b respectively. The tire 240 has a carcass structure 228 comprising an interior wall 231, and at least one cord reinforced elastomeric ply 230 extending radially outward from each bead area 220a, 220b through the sidewalls 226a, 226b respectively, and traversing the tread area 212 radially inward of the belt structure 218. From the sidewall 226a, 226b, the ply 230 extends radially inward around the bead 224a, 224b, first passing axially inward of the bead 224a, 224b, then passing radially inward of the bead 224a, 224b, then passing axially outward of the bead 224a, 224b, and finally extending radially outward to a turned up end 232a, 232b located axially outward of the main portion of the ply 230 and radially outward of the bead 224a, 224b. The bead areas 220a, 220b are shaped for compatibility with the conventionally-shaped bead seat 221a, 221b and flange 213a, 213b portions of the wheel rim 211, including an axially extending portion 234a, 234b of each rim flange 213a, 213b. An optional rim flange protector 242a, 242b may be provided on one or both of the sidewalls 226a, 226b near the bead areas 220a, 220b of the tire 240, the rim flange protector 242a, 242b comprising a preferably continuous circumferential elastomeric projection extending axially outward from each bead/sidewall area 220a/226a, 220b/226b thereby extending radially outward of the rim flange 213a, 213b, and axially outward to at least the outermost edge of the axially extending portion 234a, 234b of each rim flange 213a, 213b of the conventionally-shaped wheel rim 211.

The most significant feature of the present invention concerns the ply line in the bead area and sidewall area which are limited to the definition described above with reference to FIGS. 4A and 4B. The features of the present invention are illustrated in a first embodiment 240 in FIG. 2A showing both sides of the tire 240 in partial cross section, and in FIG. 5A showing details of a cross section of the right-hand bead area 220b and nearby portions of the sidewall 226b and rim 211. It is a feature of the present invention that, in a properly mounted and inflated tire 240, the at least one ply 230 has a ply line PL' that extends radially outward from the bead 224a, 224b at an angle $\phi$ of approximately 80° to approximately 100°, as shown in FIGS. 5A, 5B, 5C. The at least one ply 230 extends through the sidewall 226a, 226b to the tread shoulder 216a, 216b with a generally continuous curvature so that the maximum tire width (where the section width SW' is measured) is radially close to the bead 224a, 224b, preferably immediately radially outward of the flange 213a, 213b. As illustrated in FIG. 5A, the angle $\phi$ is measured between the ply line 562 and an axial line A, and the angle $\phi$ opens radially outward. In order to achieve this inventive ply line PL' with an axially outside ply turnup end 232a, 232b, there is no center apex (compare center apex 125a, 125b in FIG. 1). Thus, the main portion of the ply 230 is closely wrapped around the bead 224a, 224b and is placed close to the outside of the sidewall 226a, 226b, and is substantially parallel and closely adjacent to the ply turnup end 232a, 232b. To hold the ply 230 in position in the bead area 220a, 220b, the bead area and at least a portion of the sidewall area radially outward of the bead 224a, 224b and between the ply 230 and the interior carcass wall 231 is at least partially filled with an elastomeric reinforcement, i.e., reinforcement element 241a, 241b. In the preferred embodiment, the inventive tire 240 has approximately the same section width SW' as the section width SW of the prior art tire 110. This can be achieved by increasing the rim width to a new dimension Wr' which is suitably greater than the rim width Wr of the prior art tire 110. The reinforcement element 241a, 241b is a polymeric material selected from the group comprising thermoset plastics, thermoplastic elastomers and thermoplastics. For a typical elastomer, the material has a Modulus of about 3–300 Mpa. The reinforcement element can incorporate randomly or otherwise aligned fibers, such as aramid, nylon, rayon, polyester, of various lengths, or by the addition of filler materials, such as polyethylene, cellulose, chosen to adjust the properties of stiffness. Although the tire sidewall 226a, 226b near the bead area 220a, 220b is substantially straight (on a mounted and inflated tire), the interior reinforcement 241a, 241b is preferably shaped to produce a uniformly curved interior surface 231, thereby encouraging normal flows of elastomer during the tire curing process.

Other than the wider rim width Wr', the rim 211 to be used for the inventive tire 240 is conventionally shaped, substantially the same as the rim 111 of the prior art, and is presently available commercially. The conventionally shaped rim 211 has a rim bead seat angle "$\alpha$" of approximately 0° to approximately 15° but most commonly approximately 5°, wherein the angle a opens axially and radially outward and is formed between a rim bead seat line 560 and an axial line A. The conventionally shaped rim 211 also has a rim flange angle γ of approximately 0° to approximately 15° but most commonly approximately 0°, wherein the angle γ opens axially and radially outward and is formed between a rim flange line 564 and a radial line R. The rim flange line 564 is tangent to a flat portion of the inside surface of the flange 213a, 213b immediately after a radiused "heel" corner which joins the rim bead seat 221a, 221b to the flange 213a, 213b. Although the rim 211 and tire 240 are illustrated with perfectly parallel mating surfaces, it should be understood that the drawings herein are idealizations, and that in reality, the tire and rim surfaces may only approximately conform with each other. The elastomeric material and any optional elements in the bead area 220a, 220b or sidewalls 226a, 226b, such as chafers, chippers, flippers and sidewall inserts (not shown) are suitably shaped so that the bead base 222a, 222b approximately conforms to the rim 211 bead seat 221a, 221b and flange 213a, 213b angles and dimensions while maintaining the ply line 562 of the present invention as described hereinabove.

The tire 240 of the present invention is, for example, a P205/40R18 tire of the inventive design and the rim 211 is, for example, a conventionally-shaped and commercially available 8.0J18H2 rim wherein the "J" denotes the shape of the flanges 213a, 213b, and the "H2" denotes the shape of the remainder of the rim 211. The exemplary tire 240 and rim 211 are considered suitable replacements for the exemplary P205/55R16 tire 110 and the 6.5J15H2 rim 111 of the prior art. The tire 240 has an outside diameter of approximately 24.8 inches (630 mm) which is comparable to the outside diameter of the exemplary P205/55R16 prior art tire 110. The exemplary inventive P205/40R18 tire 240 and the corresponding exemplary 8.0J18H2 commercial rim 211 measurements are approximately as follows: rim width (Wr') is 8.0 inches (203 mm); rim diameter (Dr') is 18 inches (462 mm); section width (SW') is 8.07 inches (205 mm) which is the same as the section width (SW) of the exemplary P205/55R16 tire 110; section height (SH) is 3.40 inches (86 mm). The aspect ratio calculates to 100(86/205)=42 or approximately 40%. Because of the inventive design, the load carrying capacity LCC is approximately 615 kg at 2.5 bar (load index LI=91) which is the same as the P205/55R16 tire 110 being replaced, and which is an improvement over an LI of approximately 83 for a typical prior art P205/40R18.

Alternate Embodiments with Inside Ply Turnup

Referring now to FIG. 2B, an alternate embodiment of the present invention is illustrated as a partial cross section of a tire 240' mounted on a conventionally-shaped wheel rim 211. The alternate embodiment 240' differs from the preferred embodiment 240 primarily in the way the at least one ply 230' (compare 230) wraps around the beads 224a, 224b.

The rim 211 has the same general shape as the standard rim 111, including same-shaped bead seats 221a, 221b, and same-shaped flanges 213a, 213b with axially extending portions 234a, 234b, however the rim 211 for the tire 240 of this invention has a rim width Wr' which is generally wider than the rim width Wr of the standard rim 111. As detailed hereinbelow, various embodiments of the present invention may also require rim diameters Dr' which are different from the standard rim diameter Dr of the standard rim 111.

The tire 240' has a tread area 212 comprising a ground contacting tread 214 having two tread shoulders 216a, 216b and a circumferential belt structure 218 located radially inward of the tread 214. The tire 240 has two bead areas 220a', 220b', each bead area having a bead 224a, 224b, a bead base 222a, 222b ending in a bead toe 223a, 223b which is axially and radially inward from the bead 224a, 224b, and an interior elastomeric reinforcement 241a', 241b' radially outward of the bead 224a, 224b. Some optional elements of the bead area 220a', 220b' are not shown, but may include such common elements as chafers, chippers, and flippers. Elastomeric sidewalls 226a, 226b extend radially outward from the bead areas 220a', 220b' respectively, to the tread shoulders 216a, 216b respectively. The tire 240' has a carcass structure 228 ' comprising an interior wall 231, and at least one cord reinforced elastomeric ply 230' extending radially outward from each bead area 220a', 220b' through the sidewalls 226a, 226b respectively, and traversing the tread area 212 radially inward of the belt structure 218. From the sidewall 226a, 226b, the ply 230' extends radially inward around the bead 224a, 224b, first passing axially outward of the bead 224a, 224b, then passing radially inward of the bead 224a, 224b, then passing axially inward of the bead 224a, 224b, and finally extending radially outward to a turned up end 232a', 232b' located axially outward of the main portion of the ply 230' and radially outward of the bead 224a, 224b. The bead areas 220a', 220b' are shaped for compatibility with the conventionally-shaped bead seat 221a, 221b and flange 213a, 213b portions of the wheel rim 211, including an axially extending portion 234a, 234b of each rim flange 213a, 213b. An optional rim flange protector 242a, 242b may be provided on one or both of the sidewalls 226a, 226b near the bead areas 220a', 220b' of the tire 240', the rim flange protector 242a, 242b comprising a preferably continuous circumferential elastomeric projection extending axially outward from each bead/sidewall area 220a'/226a, 220b'/226b thereby extending radially outward of the rim flange 213a, 213b, and axially outward to at least the outermost edge of the axially extending portion 234a, 234b of each rim flange 213a, 213b of the conventionally-shaped wheel rim 211.

Important features of the alternate embodiment 240' of the present invention concern the ply line and the relative positioning of any reinforcing elastomeric material in the bead area and sidewall area, and also concern the relative positioning of the ply turnup ends 232a', 232b'. The features are illustrated in FIG. 2B which shows both sides of the tire 240' in partial cross section, and in FIG. 5B showing details of a cross section of the right-hand bead area 220b' and nearby portions of the sidewall 226b and rim 211. It is a feature of the present invention that, in a properly mounted and inflated tire 240', the at least one ply 230' has a ply line 562 which extends radially outward from the bead 224a, 224b at an angle φ of approximately 80° to approximately 100°. The at least one ply 230' extends through the sidewall 226a, 226b to the tread shoulder 216a, 216b with a generally continuous curvature so that the maximum tire width (where the section width SW' is measured) is radially close to the bead 224a, 224b, preferably immediately radially outward of the flange 213a, 213b. As illustrated in FIG. 5B, the angle φ is measured between the ply line 562 and an axial line A, and the angle φ opens radially outward. As in the preferred embodiment 240, in order to achieve this inventive ply line, there is no center apex (compare center apex 125a, 125b in FIG. 1). In contrast with the tire 240 of the preferred embodiment, the tire 240' of the alternate embodiment of the invention utilizes a reversed ply turnup to assist in suitable placement of the ply 230' and the ply line 562. Again, the details of the plyline location according to the present invention are discussed hereinbefore with regard to description of FIGS. 4A and 4B. Thus, the main portion of the ply 230' extends with a substantially straight ply line 562 radially inward through each sidewall 226a, 226b close to the outside of the sidewall 226a, 226b, and passes axially outward of the bead 224a, 224b, and then is closely wrapped around the bead 224a, 224b to end at the ply turnup end 232a', 232b' which is axially inward of the main portion of the ply 230' and substantially parallel and closely 20 adjacent to the main portion of the ply 230'. To hold the ply 230' in position in the bead area 220a', 220b', the bead area and at least a portion of the sidewall area radially outward of the bead 224a, 224b and between the ply turnup end 232a', 232b' and the interior carcass wall 231 is at least partially filled with an elastomeric reinforcement, i.e., reinforcement element 241a', 241b'. If, as shown in FIG. 2B, the interior reinforcement 241a', 241b' extends radially outward beyond the ply turnup end 232a', 232b', then the interior reinforcement 241a', 241b' also lies between the ply 230' and the interior carcass wall 231. In the preferred embodiment, the inventive tire 240' has approximately the same section width SW' as the section width SW of the prior art tire 110. This can be achieved by increasing the rim width to a new dimension Wr' which is suitably greater than the rim width Wr of the prior art tire 110. The interior reinforcement 241a', 241b' is a polymeric material selected from the group comprising thermoset plastics, thermoplastic elastomers and thermoplastics. For a typical elastomer, the material has a Modulus of about 3–300 Mpa. The reinforcement element can incorporate randomly or otherwise aligned fibers, such as aramid, nylon, rayon, polyester, of various lengths, or by the addition of filler materials, such as polyethylene, cellulose, chosen to adjust the properties of stiffness. Although the tire sidewall 226a, 226b near the bead areas 220a', 220b' is substantially straight (on a mounted and inflated tire), the interior reinforcement 241a, 241b are preferably shaped to produce a uniformly curved interior surface 231, thereby encouraging normal flows of elastomer during the tire curing process.

Other than the wider rim width Wr', the rim 211 to be used for the inventive tire 240' is conventionally shaped, substantially the same as the rim 111 of the prior art, and is presently available commercially. The conventionally shaped rim 211 has a rim bead seat angle α of approximately 0° to approximately 15° but most commonly approximately 5°, wherein the angle α opens axially and radially outward and is formed between a rim bead seat line 560 and an axial line A. The conventionally shaped rim 211 also has a rim flange angle γ of approximately 0° to approximately 15° but most commonly approximately 0°, wherein the angle γ opens axially and radially outward and is formed between a rim flange line 564 and a radial line R. The rim flange line 564 is tangent to a flat portion of the inside surface of the flange 213a, 213b immediately after a radiused "heel" corner which joins the rim bead seat 221a, 221b to the flange 213a, 213b. The elastomeric material and any optional bead area 220a', 220b' or sidewall 226a, 226b elements such as chafers, chippers, flippers and sidewall inserts (not shown) are suitably shaped so that the bead base 222a, 222b approximately conforms to the rim 211 bead seat 221a, 221b and flange 213a, 213b angles and dimensions while maintaining the ply line 562 of the present invention as described hereinabove.

A variation of the reversed ply turnup and reinforcement construction of the tire 240' forms a second alternate embodiment 240" of the present invention, and is illustrated in FIG. 5C. The features illustrated in FIG. 5C are those seen in a cross section of a right-hand portion of the tire 240" including the bead area and nearby portions of the sidewall and rim. It should be understood that the corresponding left-hand portion (not shown) of the tire 240" is substantially a mirror image of the right-hand portion of the tire 240" which is illustrated in FIG. 5C and described hereinbelow. Comparing FIG. 5C with FIGS. 1 and 5B, it can be seen that the main difference for the second alternate tire embodiment 240" is in the relative positioning of the reverse ply turnup end 232b" (compare 232b' ) and of surrounding elements 525b, 344b (compare 125b, 241b').

The rim 211 in FIG. 5C is generally the same as the rim 211 illustrated in FIGS. 5A and 5B, including same-shaped bead seats 221a, 221b, and same-shaped flanges 213a, 213b with axially extending portions 234a, 234b.

The illustrated portion of the tire 240" has a bead area 220b" having a metal wire bead 224b, a bead base 222b ending in a bead toe 223b which is axially and radially inward from the bead 224b, and a center reinforcement 525b radially outward of the bead 224b. Some optional elements of the bead area 220b" are not shown, but may include such common elements as chafers, chippers, and flippers. An elastomeric sidewall 226b extends radially outward from the bead area 220b ". The tire 240" has a carcass structure 228" comprising an interior wall 231, and at least one cord reinforced elastomeric ply 230" extending radially outward from the bead area 220b" and through the sidewall 226b. From the sidewall 226b, the ply 230" extends radially inward around the bead 224b, first passing axially outward of the bead 224b, then passing radially inward of the bead 224b, then passing axially inward of the bead 224b, and finally extending radially outward to a turned up end 232b" located axially inward of the main portion of the ply 230" and radially outward of the bead 224b. The bead area 220b" is shaped for compatibility with the conventionally-shaped bead seat 221b and flange 213b portions of the wheel rim 211, including an axially extending portion 234b of each rim flange 213b.

Important features of the second alternate embodiment 240" of the present invention concern the ply line and the relative positioning of any reinforcing elastomeric material in the bead area and sidewall area, and also concern the relative positioning of the ply turnup ends. The features are illustrated in FIG. 5C which shows details of a cross section of the right-hand bead area 220b" and nearby portions of the sidewall 226b and rim 211. It is a feature of the present invention that, in a properly mounted and inflated tire 240", the at least one ply 230" has a ply line 562 which extends radially outward from the bead 224b at an angle φ of approximately 80° to approximately 100° and incorporating the limitations to the crown portion as described herein before with regard to FIGS. 4A and 4B. The at least one ply 230" extends through the sidewall 226b with a generally continuous curvature so that the maximum tire width (where the section width SW' is measured) is radially close to the bead 224b, preferably immediately radially outward of the flange 213b. As illustrated in FIG. 5C, the angle φ is measured between the ply line 562 and an axial line A, and the angle φ opens radially outward. Because the second alternate embodiment of the invention 240" utilizes a ply turnup which is unconventionally reversed to place the ply turnup end 232b" axially inside relative to the main portion of the ply 230", the inventive ply line 562 can be achieved regardless of the positioning of the reversed ply turnup end 232b'. In contrast with the alternate embodiment of the invention 240', the second alternate embodiment 240" employs a center reinforcement 525b placed between the main portion of the ply 230" and the reversed turnup portion of the ply 230" which ends at the reversed ply turnup end 232b ". Depending on the contour of the interior carcass wall 231, there may be a need for additional elastomeric filler or reinforcement material (i.e., an interior apex 344b ) in the area between the ply turnup end 232b" and the interior carcass wall 231. If, as shown in FIG. 5C , the interior reinforcement 344b extends radially outward beyond the ply turnup end 232b" , then the interior reinforcement 344b also lies between the ply 230" and the interior carcass wall 231. The center reinforcement 525b and the interior reinforcement 344b comprise an elastomeric material, such as a polymeric material selected from the group comprising thermoset plastics, thermoplastic elastomers and thermoplastics. For a typical elastomer, the material has a Modulus of about 3–300 Mpa. The reinforcement element can incorporate randomly or otherwise aligned fibers, such as aramid, nylon, rayon, polyester, of various lengths, or by the addition of filler materials, such as polyethylene, cellulose, chosen to adjust the properties of stiffness. Although the tire sidewall 226b near the bead area 220b" is substantially straight (on a mounted and inflated tire), the reinforcing element 344b is preferably shaped to produce a uniformly curved interior surface 231, thereby encouraging normal flows of elastomer during the tire curing process.

Other than the wider rim width Wr', the rim 211 to be used for the inventive tire 240" is conventionally shaped, substantially the same as the rim 111 of the prior art, and is presently available commercially. The conventionally shaped rim 211 has a rim bead seat angle α of approximately 0° to approximately 15° but most commonly approximately 5°, wherein the angle α opens axially and radially outward and is formed between a rim bead seat line 560 and an axial line A. The conventionally shaped rim 211 also has a rim flange angle γ of approximately 0° to approximately 15° but most commonly approximately 0°, wherein the angle γ opens axially and radially outward and is formed between a rim flange line 564 and a radial line R. The rim flange line 564 is tangent to a flat portion of the inside surface of the flange 213a, 213b immediately after a radiused "heel" corner which joins the rim bead seat 221a, 221b to the flange 213a, 213b. The elastomeric material and any optional bead area 220b" or sidewall 226b elements such as chafers, chippers, flippers and sidewall inserts (not shown) are suitably shaped so that the bead base 222b approximately conforms to the rim 211 bead seat 221a, 221b and flange 213a, 213b angles and dimensions while maintaining the ply line 562 of the present invention as described hereinabove.

Alternate Embodiment for Extended Mobility Technology (EMT) Tires

Another alternate embodiment of the present invention includes incorporation of extended mobility technology (EMT) also known as self-supporting technology—i.e., a pneumatic tire designed to function acceptably well for a limited vehicle speed and mileage after the EMT tire has lost most or all of its inflation pressure ("flat"). A particular sidewall and tread shoulder design are presented hereinbelow as a means of illustrating a preferred EMT embodiment of the present invention, but the invention is not limited to this particular embodiment.

Referring now to FIG. 6, a preferred EMT embodiment of the present invention is illustrated as a partial cross section of a tire 650 mounted on a conventionally-shaped wheel rim 611. The rim 611 has the same general shape as the standard rim 111 (also 211), including same-shaped bead seats 621a, 621b, and same-shaped flanges 613a, 613b with axially extending portions 634a, 634b, however the rim 611 for the tire 650 of this invention has a rim width Wr" which is approximately 1 to 3 inches (25.4–76.2 mm) wider than the rim width Wr of the standard rim 111. As detailed hereinabove, various embodiments of the present invention may also require rim diameters Dr" which are different from the standard rim diameter Dr of the standard rim 111.

The tire 650 has a tread area 612 comprising a ground contacting tread 614 having two tread shoulders 616a, 616b and a circumferential belt structure 618 located radially inward of the tread 614. The tread shoulders 616a, 616b are optionally extended axially outward somewhat as shown, in order to enhance the EMT tire 650 performance while running on low to zero inflation pressures, i.e. running flat. The tire 650 has two bead areas 620a, 620b, each bead area having a wire bead 624a, 624b, a bead base 622a, 622b ending in a bead toe 623a, 623b which is axially and radially inward from the bead 624a, 624b, and an interior reinforcement 652a, 652b radially outward of the bead 624a, 624b. Some optional elements of the bead area 620a, 620b are not shown, but may include such common elements as chafers, chippers, and flippers. Elastomeric sidewalls 626a, 626b extend radially outward from the bead areas 620a, 620b respectively, to the tread shoulders 616a, 616b respectively. The tire 650 has a carcass structure 628 comprising an interior wall 631, and at least one cord reinforced elastomeric ply 630 extending radially outward from each bead area 620a, 620b through the sidewalls 626a, 626b respectively, and traversing the tread area 612 radially inward of the belt structure 618. From the sidewall 626a, 626b, the ply 630 extends radially inward around the bead 624a, 624b, first passing axially inward of the bead 624a, 624b, then passing radially inward of the bead 624a, 624b, then passing axially outward of the bead 624a, 624b, and finally extending radially outward to a turned up end 632a, 632b located axially outward of the main portion of the ply 630 and radially outward of the bead 624a, 624b. The bead areas 620a, 620b are shaped for compatibility with the conventionally-shaped bead seat 621a, 621b and flange 613a, 613b portions of the wheel rim 611, including an axially extending portion 634a, 634b of each rim flange 613a, 613b. An optional rim flange protector 642a, 642b may be provided on one or both of the sidewalls 626a, 626b near the bead areas 620a, 620b of the tire 650, the rim flange protector 642a, 642b comprising a preferably continuous circumferential elastomeric projection extending axially outward from each bead/sidewall area 620a/626a, 620b/626b thereby extending radially outward of the rim flange 613a, 613b, and axially outward to at least the outermost edge of the axially extending portion 634a, 634b of each rim flange 613a, 613b of the conventionally-shaped wheel rim 611.

Important features of the present invention concern the ply line and the relative positioning of any apex or reinforcing elastomeric material in the bead area and sidewall area. The features are illustrated in the EMT embodiment 650 in FIG. 6 showing both sides of the tire 650 in partial cross section, and in FIG. 5A showing details of a cross section of the right-hand bead area 220b and nearby portions of the sidewall 226b and rim 211. It is a feature of the present invention that, in a properly mounted and inflated tire 650, the at least one ply 630 has a ply line 662 which extends radially outward from the bead 624a, 624b at an angle φ of approximately 80° to approximately 100°. As explained hereinbefore, the plyline location according to the present invention is defined with regard to description of FIGS. 4A and 4B. The at least one ply 630 extends through the sidewall 626a, 626b to the tread shoulder 616a, 616b with a generally continuous curvature so that the maximum tire width (where the section width SW" is measured) is radially close to the bead 624a, 624b, preferably immediately radially outward of the flange 613a, 613b. As illustrated in FIG. 5A, the angle φ is measured between the ply line 562 and an axial line A, and the angle φ opens axially and radially outward. In order to achieve this inventive ply line with an axially outside ply turnup end 632a, 632b, there is no center apex (compare center apex 125a, 125b in FIG. 1). Thus the main portion of the ply 630 is closely wrapped around the bead 624a, 624b and is placed close to the outside of the sidewall 626a, 626b, and is substantially parallel and closely adjacent to the ply turnup end 632a, 632b. To hold the ply 630 in position in the bead area 620a, 620b, the bead area and at least a portion of the sidewall area radially outward of the bead 624a, 624b and between the ply 630 and the interior carcass wall 631 is at least partially filled with an elastomeric reinforcement 652a, 652b.

An added function of the reinforcement element 652a, 652b in an EMT tire is to provide support for the loaded tire 650 when it is running flat. For run-flat usage, the interior reinforcement element 652a, 652b is preferably made of elastomeric material designed to reinforce the sidewalls 626a, 626b of the EMT tire 650, especially during run-flat or extended mobility running. The elastomeric material of which the interior reinforcements 652a, 652b are made preferably has low hysteresis with a hot rebound in the range of about 70 to about 90 and preferably about 80 to about 90, to inhibit the buildup of heat during both normal inflated operation and, especially, during run-flat operation when flexure of the apex/reinforcements 652a, 652b is greatest. If the hot rebound were lower than 55, the material would have a tendency to burn during run-flat operation. The elastomeric material has a Shore A hardness of about 70 to about 80, a Modulus of about 5 to about 9 Mpa and a Hot Rebound (100E C.) of about 70 to about 90. However, it is recognized by the inventor that the elastomeric material of which the reinforcements 652a, 652b are made might have its properties further adjusted and controlled by means of the incorporation of randomly or otherwise aligned fibers, such as aramid, nylon, rayon, polyester, of various lengths, or by the addition of filler materials, such as polyethylene, or cellulose, chosen to adjust the properties of stiffness.

Although the tire sidewall 626a, 626b near the bead area 620b is substantially straight (on a mounted and inflated tire), the interior support 652a, 652b is preferably shaped to produce a uniformly curved interior surface 631, thereby encouraging normal flows of elastomer during the tire curing process. Other characteristics of the interior support 652a, 652b shape as well as the remainder of the tire carcass structure 628 are optionally determined according to the requirements of an extended mobility tire, and are not the subject of the present invention.

In the preferred EMT embodiment, the inventive tire 650 has approximately the same section width SW" as the section width SW of the prior art tire 110. This can be achieved by increasing the rim width to a new dimension Wr" which is suitably greater than the rim width Wr of the prior art tire 110. Other than the wider rim width Wr" , the rim 611 to be used for the inventive tire 650 is conventionally shaped, substantially the same as the rim 111 of the prior art, and is presently available commercially. The conventionally shaped rim 611 has a rim bead seat angle α of approximately 0° to approximately 15° but most commonly approximately 5°, wherein the angle α opens axially and radially outward and is formed between a rim bead seat line 560 and an axial line A. The conventionally shaped rim 611 also has a rim flange angle γ of approximately 0° to approximately 15° but most commonly approximately 0°, wherein the angle γ opens axially and radially outward and is formed between a rim flange line 564 and a radial line R. The rim flange line 564 is tangent to a flat portion of the inside surface of the flange 613a, 613b immediately after a radiused "heel" corner which joins the rim bead seat 621a, 621b to the flange 613a, 613b. The elastomeric material and any optional bead area 620a, 20b or sidewall 626a, 626b elements such as chafers, chippers, flippers and sidewall inserts (not shown) are suitably shaped so that the bead base 622a, 622b approximately conforms to the rim 611, bead seat 621a, 621b and flange 613a, 613b angles and dimensions while maintaining the ply line 562 of the present invention as described hereinabove with reference to FIGS. 4A and 4B.

The tire 650 of the present invention is, for example, an EMT version of a P205/40R18 tire of the inventive design and the rim 611 is, for example, a conventionally shaped and commercially available 8.0J18H2 rim wherein the "J" denotes the shape of the flanges 613a, 613b, and the "H2" denotes the shape of the remainder of the rim 611. The exemplary tire 650 and rim 611 are considered suitable replacements for the exemplary P205/55R16 tire 110 and the 6.5J15H2 rim 111 of the prior art. The tire 650 has an outside diameter of approximately 24.8 inches (630 mm) which is comparable to the outside diameter of the exemplary P205/55R16 prior art tire 110. The exemplary inventive P205/40R18 tire 650 and the corresponding exemplary 8.0J18H2 commercial rim 611 measurements are approximately as follows: rim width (Wr") is 8.0 inches (203 mm); rim diameter (Dr") is 18 inches (462 mm); section width (SW") is 8.07 inches (205 mm) which is the same as the section width (SW) of the exemplary P205/55R16 tire 110; section height (SH) is 3.40 inches (86 mm). The aspect ratio calculates to 100(86/205)=42 or approximately 40%. Because of the inventive design, the load carrying capacity LCC is approximately 615 kg which is the same as the P205/55R16 tire 110 being replaced, and which is an improvement over a LCC of approximately 487 kg (load index LI=83) for a typical prior art P205/40R18.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic passenger car tire having a tread area, a carcass structure including two bead areas each comprising a bead, at least one cord-reinforced elastomeric ply extending between the two bead areas, and two sidewalls, one sidewall extending between the tread area and each bead area; the tire characterized by:

a section width defined by lines L1 and L2 disposed orthogonally to an axis of rotation of the tire and located one on an outside surface of each sidewall, exclusive of decorations and sidewall-protecting ribs or bars;

a plyline that follows the meridional path of a radially and axially outermost one of the at least one ply;

points P1, P2 on the plyline, being located where the plyline is axially outside of one of the beads and simultaneously at a minimum radial distance of dp1, dp2, respectively, from the axis of rotation AR;

lines M1 and M2 each parallel to, and axially inwards of, lines L1 and L2, respectively, and passing through points P1 and P2, respectively;

a first distance of 1 mm to 5 mm being the spacing from line L1 to line M1, and from line L2 to line M2;

limiting radial distances r1 and r2 from the axis of rotation AR that exceed the distances dp1 and dp2, respectively, by a value of 30% to 70% of a section height SH of the tire, wherein the section height SH is defined as half the difference between an outer diameter of the tire and a nominal rim diameter for the tire; and the plyline extending radially outward in each sidewall to the limiting radial distance r1, r2 without axially deviating from lines M1, M2, respectively, by more than a second distance of 0 mm to 5 mm.

2. The tire of claim 1, characterized in that:

the lines M1 and M2 are spaced a first distance of 2 mm to 4 mm from lines L1 and L2, respectively.

3. The tire of claim 1, characterized in that:

the plyline extends radially outward in each sidewall to the limiting radial distance r1, r2 without axially deviating from lines M1, M2, respectively, by more than a second distance of 0 mm to 3 mm.

4. The tire of claim 1, characterized in that:

the plyline in the sidewalls extends radially outward from each bead at an angle $\phi$ to the axial direction; and in each sidewall, the angle $\phi$ of the plyline opens radially outward and is in the range of 80 degrees to 100 degrees.

5. The tire of claim 1, characterized in that:

each bead area has a cross sectional shape which is substantially flat across a bead base having a rim bead seat line which forms an angle $\alpha$ to the axial direction wherein the angle $\alpha$ opens axially and radially outward and is in the range of 0 to 20 degrees; and each bead area has a cross sectional shape which is substantially flat along a rim flange line forming an angle $\gamma$ to the radial direction, wherein the angle $\gamma$ opens axially and radially outward and is in the range of 0 to 15 degrees.

6. The tire of claim 1, characterized in that:

the at least one ply extends with a generally continuous curvature through each sidewall to a tread shoulder, such that the tire section width is located immediately radially outward of a flange on a rim used for mounting the tire.

7. The tire of claim 1, characterized in that:

a main portion of the at least one ply extends through each sidewall to the bead, then the at least one ply is closely wrapped around the bead, passing radially inward of the bead, and has a turned up end located substantially parallel and closely adjacent to the main portion of the at least one ply radially outward of the bead; and the bead area and at least a portion of the sidewall radially outward of the bead, and between the at least one ply and an interior carcass wall, is at least partially filled with an elastomeric reinforcement.

8. The tire of claim 7, characterized in that:

the turned up end of the at least one ply is axially outward of the main portion of the at least one ply.

9. The tire of claim 7, characterized in that:

the elastomeric reinforcement is made of elastomeric material to reinforce the sidewalls of an extended mobility tire during extended mobility running while uninflated.

10. The tire of claim 7, characterized in that:

the elastomeric reinforcement is shaped to produce a uniformly curved interior surface.

11. A method of increasing load carrying capacity for a pneumatic tire having a tread area, a carcass structure including two bead areas each comprising a bead, at least one cord-reinforced elastomeric ply extending between the two bead areas, and two sidewalls, one sidewall extending between the tread area and each bead area; the method characterized by the steps of:

defining lines L1 and L2 corresponding to axially-outer limits of a section width for the tire, the lines L1, L2 being disposed orthogonally to an axis of rotation of the tire and located one on an outside surface of each sidewall, exclusive of decorations and sidewall-protecting ribs or bars;

defining a plyline that follows the meridional path of a radially and axially outermost one of the at least one ply;

defining points P1, P2 on the plyline, being located where the plyline is axially outside of one of the beads and simultaneously at a minimum radial distance of dp1, dp2, respectively, from the axis of rotation;

defining lines M1 and M2 each parallel to, and axially inwards of, lines L1 and L2, respectively, and passing through points P1 and P2, respectively;

constructing the tire such that a first distance from line L1 to line M1, and from line L2 to line M2, is restricted to being 1 mm to 5 mm in magnitude;

defining limiting radial distances r1 and r2 from the axis of rotation, such that the limiting radial distances r1 and r2 exceed the radial distances dp1 and dp2, respectively, by a value of 30% to 70% of a section height SH of the tire, wherein the section height SH is defined as half the difference between an outer diameter of the tire and a nominal rim diameter for the tire; and constructing the tire such that the plyline extends radially outward in each sidewall to the limiting radial distance r1, r2 without axially deviating from the lines M1, M2, respectively, by more than a second distance of 0 mm to 5 mm.

12. The method of claim 11, further characterized by the step of:

constructing the tire without a center apex between the at least one ply and a turned up end of the at least one ply, such that:

a main portion of the at least one ply extends through each sidewall to the bead, then the at least one ply is closely wrapped around the bead, passing radially inward of the bead, and has the turned up end located substantially parallel and closely adjacent to the main portion of the at least one ply radially outward of the bead.

13. The method of claim 12, further characterized by the step of:

constructing the tire such that the bead area and at least a portion of the sidewall radially outward of the bead, and between the at least one ply and an interior carcass wall, is at least partially filled with an elastomeric reinforcement.

* * * * *